Nov. 17, 1970  M. ALTISSIMO  3,540,178

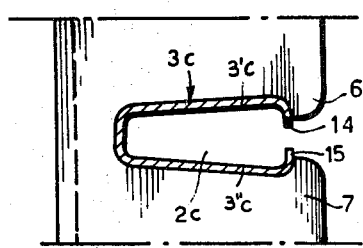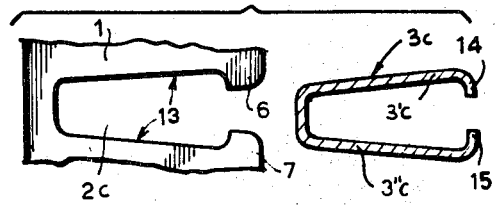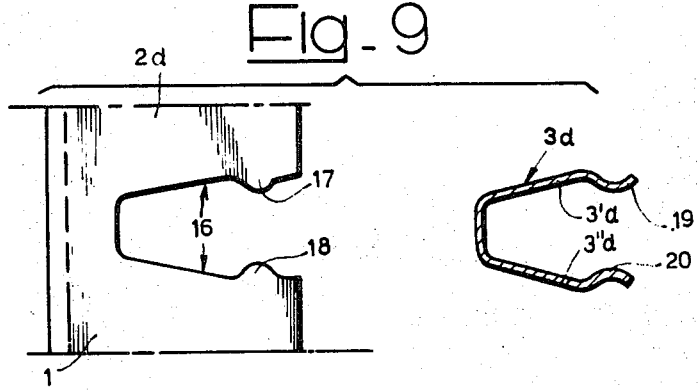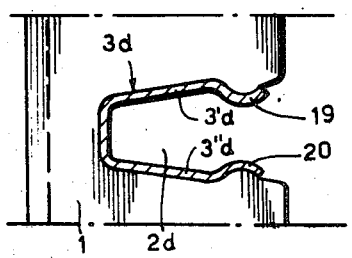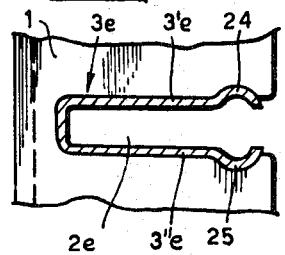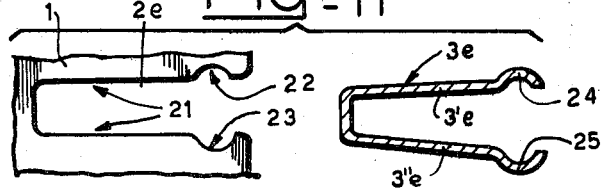

OPEN WORK GRILLE STRUCTURE

Filed March 25, 1968  6 Sheets-Sheet 3

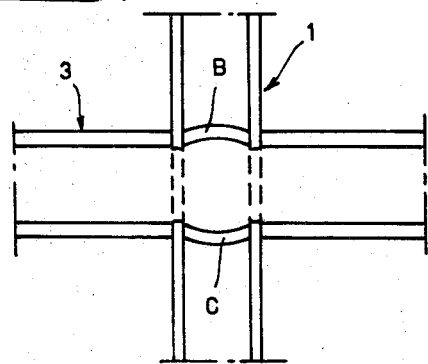
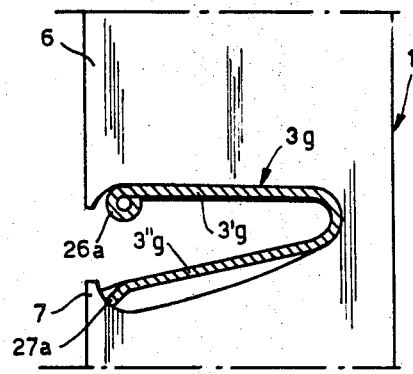
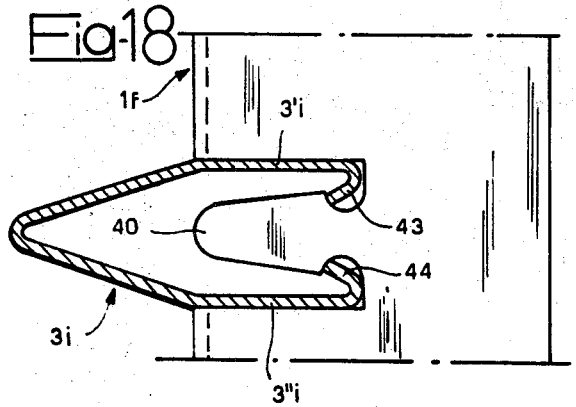
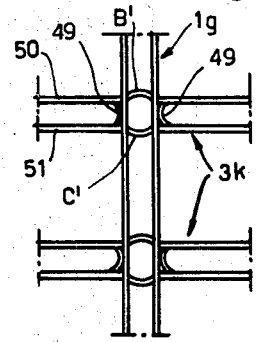
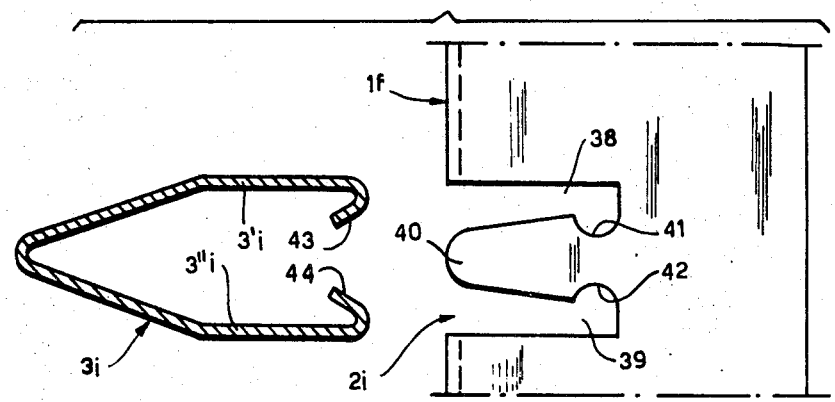

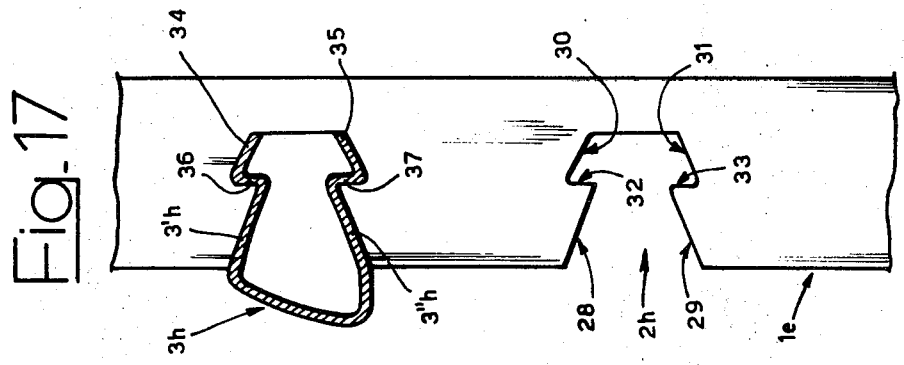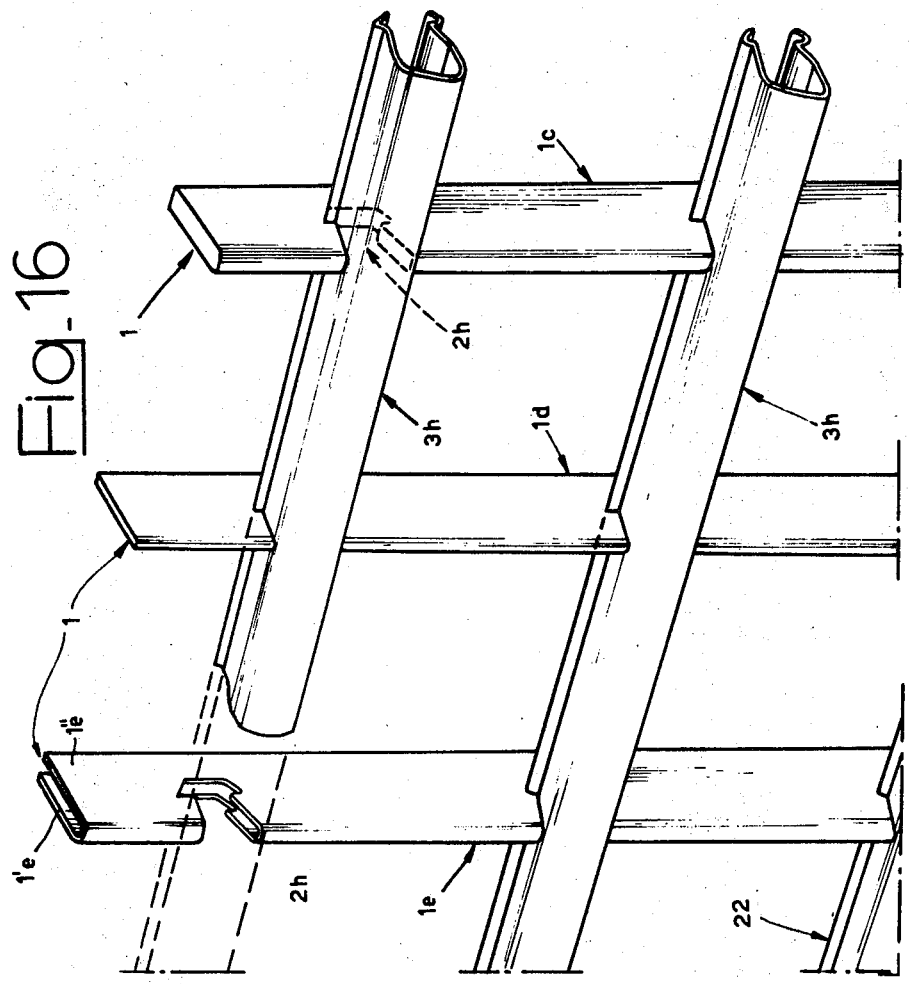

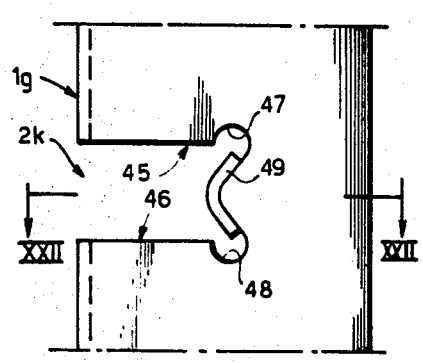
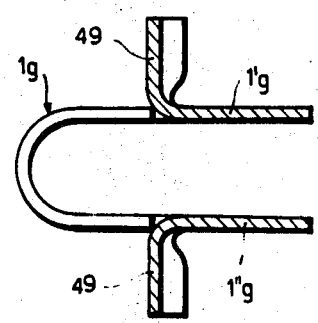
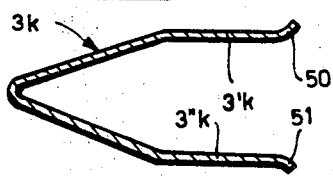
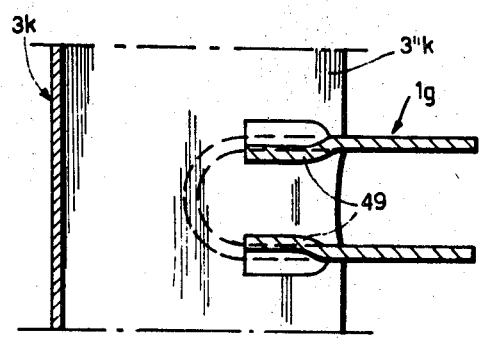
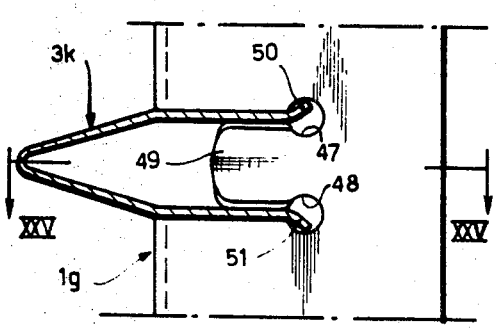
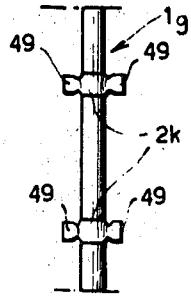

United States Patent Office 3,540,178
Patented Nov. 17, 1970

3,540,178
OPEN WORK GRILLE STRUCTURE
Massimo Altissimo, Turin, Italy, assignor to ULMA
S.p.A., Beinasco, Turin, Italy
Filed Mar. 25, 1968, Ser. No. 715,615
Claims priority, application Italy, Mar. 31, 1967,
51,149/67; Mar. 8, 1968, 50,843/68
Int. Cl. E04c 2/42
U.S. Cl. 52—669                              6 Claims

ABSTRACT OF THE DISCLOSURE

An open work grille structure is assembled from intersecting first and second sets of parallel structural members, the first members having spaced apart notches in which the second members, of channel section, snap-engage for ease of assembly.

---

This invention relates to open work grille structures of the type comprising a plurality of intersecting elongated structural members.

The members forming such open work structures are usually interconnected by separately attached connecting members or by welding, the latter spoiling the finish of the structure. Moreover, the manufacture of such open work structures, is time-consuming owing to the large number of assembly and finishing steps, and the resulting structure is of considerable weight.

A primary object of this invention is to obviate the above drawbacks by providing an assembly of structural members which can be interconnected to form an open work structure of the abovementioned type without welding or using separately attached connecting members.

A further object of the invention is to provide an assembly of structural members of the abovementioned type, which are simple, inexpensive and strong in construction, such as to make the assembly of the open work structure easy and simple.

The assembly of structural members according to the invention is characterized by at least one first structural member having a plurality of spaced apart shaped notches and at least one second structural member of channel section adapted to snap-engage in a said notch in the first structural member.

The invention will be more clearly understood from the following detailed description, given by way of example only, referring to the accompanying drawings, wherein.

Figure 1:
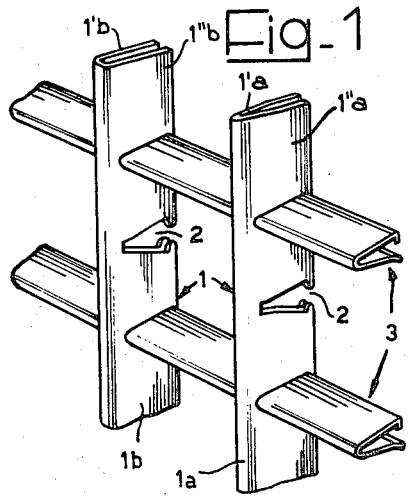
FIG. 1 is a perspective view of a portion of an open work structure assembled from structural members according to one embodiment of the invention.
Figure 2:
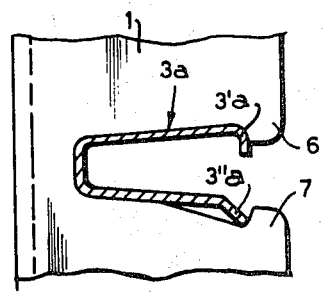
FIG. 2 is a vertical cross section on an enlarged scale of parts of the assembled open work structure of FIG. 1.
Figure 3:
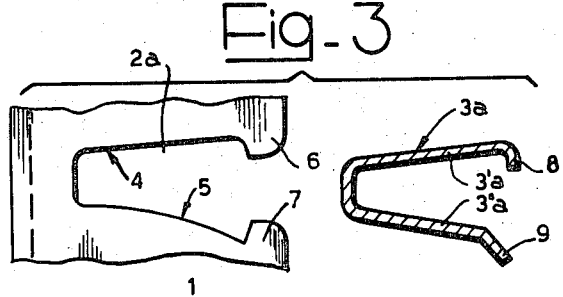
FIG. 3 is a similar view showing the parts of the structure of FIG. 2 in their disassembled condition.
Figure 12:
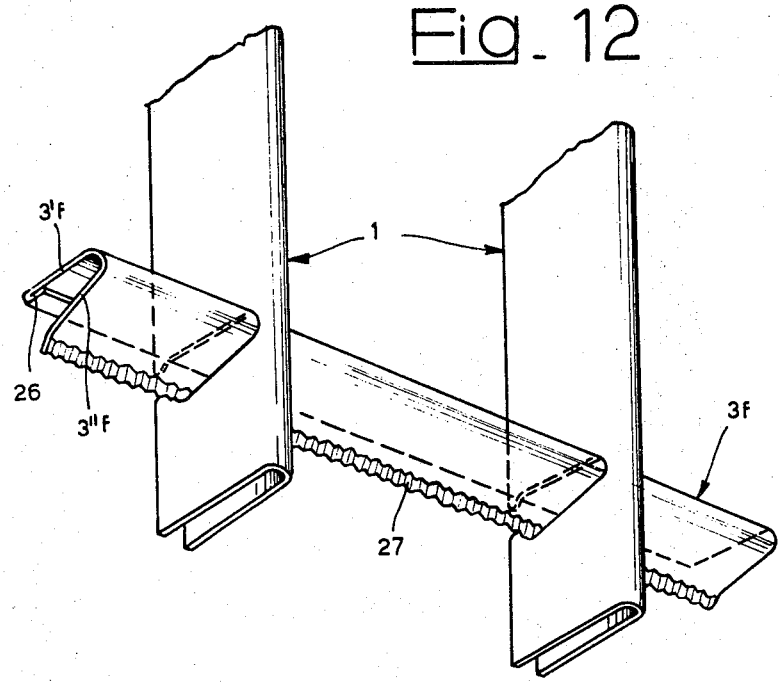
Figure 13:
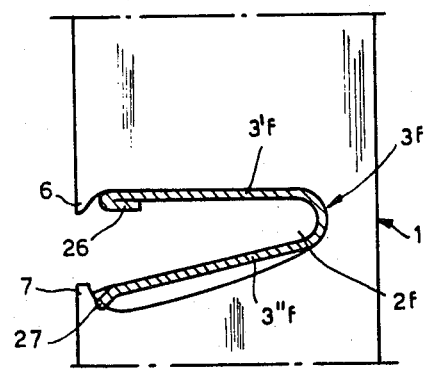

FIGS. 4 and 5, 6 and 7, 8 and 9, 10 and 11 show four modifications of the structure of FIGS. 2 and 3 in assembled and disassembled conditions respectively;

FIG. 12 is a perspective view of part of an open work structure comprising structural members according to a further modification of the structure shown in FIG. 1;

FIG. 13 is a vertical cross section through the structure of FIG. 12;

FIG. 14 is a vertical cross section corresponding to that of FIG. 13 showing a modification of the structure of FIGS. 12 and 13;

FIG. 15 is a rear elevational view of part of an open work structure according to a modification of that shown in the preceding figures;

FIG. 16 is a perspective view of part of an open work structure formed from structural members according to a further embodiment of the invention;

FIG. 17 is a vertical cross section of the structure shown in FIG. 16, with one of the structural members 3h removed;

FIG. 18 is a vertical cross section of part of an open work structure according to a modification of that shown in FIGS. 16, 17;

FIG. 19 is an exploded view of the structure shown in FIG. 18;

FIG. 20 is a front elevational view of part of a first structural member of an open work structure according to a further embodiment of the invention;

FIG. 21 is a side elevational view on an enlarged scale of part of the structural member shown in FIG. 20;

FIG. 22 is a cross sectional view on the line XXII—XXII in FIG. 21;

FIG. 23 is a cross sectional view of a second structural member adapted to cooperate with the first structural member shown in FIGS. 20–22;

FIG. 24 is a vertical cross section of part of an assembled open work structure formed from the structural members shown in FIGS. 20 and 23;

FIG. 25 is a cross sectional view of the structure on line XXV—XXV of FIG. 24, and FIG. 26 is a rear elevational view on a smaller scale of the assembled open work structure shown in FIGS. 24 and 25.

Referring to FIG. 1, an open work grille structure is assembled from a plurality of parallel first structural members 1 extending vertically and formed with shaped notches 2 and intersecting second horizontally extending structural members 3. The second structural members are of substantially channel-shaped cross section, for example, V or U-shaped profile in cross section, and are adapted to snap into respective notches 2 in the first structural members 1.

In forming the open work structure the first structural members 1 could, of course, extend horizontally instead of vertically as shown. Also, the second structural members 3 could intersect the first members 1 obliquely instead of orthogonally as shown in the drawings.

The first structural members 1 in this embodiment are of channel section and may have a U-profile (1a) or V-profile (1b). The members 1a, 1b have pairs of walls 1'a, 1"a and 1'b, 1"b respectively, with pairs of aligned notches 2 cut out from the rear edges of the member. The notches 2 may be all provided along the rear edges only of the structural member 1, as shown, so that they face in a common direction. Alternatively, the notches may be distributed between both the front and rear opposite edge surfaces of the member 1.

As shown in FIGS. 2 to 10 the second structural member 3 may be of various cross sectional shapes, adapted to snap into the notches 2 of the first structural members 1.

According to the embodiment shown in FIGS. 2 and 3, a second structural member 3a is shown having a substantially U-shaped cross-sectional profile. The member 3a is formed with two opposite slightly diverging walls 3'a, 3"a. One wall 3'a is formed with an inturned edge 8, and the other wall 3"a is formed with an outwardly flared edge 9.

Each structural member 3a cooperates with notches 2a cut in the first structural members 1, each notch 2a being bounded by upper and lower edges 4, 5 terminating at the open end of the notch 2a in respective inwardly extending projections 6, 7. The upper edge 4 matches the profile of one wall 3'a of the second structural member 3a, and the lower edge 5 slopes gradually downwardly to its respective projection 7 to form a seat in which the flared edge 9 of the opposite wall 3″a of the second structural member 3a engages.

Figure 4:
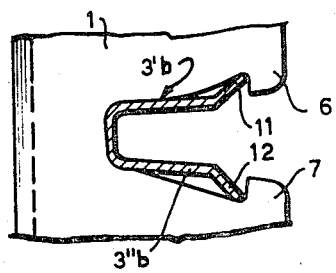
Figure 5:
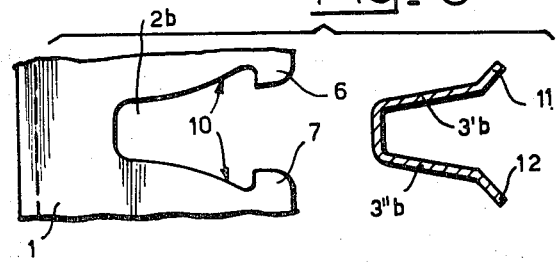

In a modification of the embodiment of FIGS. 2 and 3, shown in FIGS. 4 and 5, each second structural member 3b is provided with two symmetrical diverging walls 3′b, 3″b defining a V-shaped channel and formed with symmetrical outwardly flared edges 11, 12, the structural member 3b cooperating with notches 2b in the first structural members 1. Each notch 2b is confined by two symmetrical edges 10 diverging from the bottom of the notch towards the respective projections 6, 7 with which the flared edges 11, 12 of the second structural member 3b are engaged by snap action.

According to a further modification, shown in FIGS. 6 and 7, each second structural member 3c is in cross section of a substantially C-shaped cross-sectional profile and is formed with two slightly diverging walls 3′c, 3″c provided with symmetrical inwardly turned edges 14, 15. The structural member 3c cooperates with matching notches 2C in the first structural member 1, each notch 2C being confined by symmetrical edges 13 converging towards the bottom of the notch and terminating in respective projections 6, 7 at the open end of the notch 2C.

FIGS. 8 and 9 show a further modification in which each second structural member 3d is of substantially V-shaped cross-sectional profile and is formed with two diverging walls 3′d, 3″d provided with respective rounded edges 19, 20 having their convex sides facing each other and projecting inwardly. The structural member 3d cooperates with notches 2d in the first structural member 1, each said notch 2d being bounded by edges 16 diverging from the base of the notch and provided with projections 17, 18 symmetrically arranged adjacent the open end of the notch. The projections 17, 18 match the profiles of the rounded edges 19, 20 on the structural member 3d, and are engaged thereby upon assembly, as illustrated in FIG. 8.

FIGS. 10, 11 show a yet further modification in which each second structural member 3e is of substantially U-shaped cross-sectional profile and is formed with two opposite walls 3′e, 3″e having respective rounded edges 24, 25 of semicircular profile extending outwardly and concave towards each other. The structural member 3e cooperates with notches 2e in the first structural member 1, each notch 2e being bounded by parallel edges 21. Two semi-circular symmetrical recesses 22, 23 are formed in the edges 21 near the open end of the notch 2e and are shaped to engage the rounded edges 24, 25 of the second structural member 3e upon assembly of the first and second structural members (FIG. 10).

In each of the embodiments described with reference to FIGS. 1–11, the second structural members 3 are so shaped that before assembly their opposite walls diverge by a larger extent than the bounding edges of the respective notches 2 in the first member 1, so that resilient deformation of the said walls takes place on assembly of the first and second members. A resilient reaction therefore holds the second structiral members 3 constantly engaged in the notches 2 in which they are accommodated.

Upon assembly of the open work structure the second structural members 3 are resiliently deformed to fit into the respective notches 2 until their edges snap-engage in their respective seats in the notches. Upon such snap engagement the second structural members 3 cannot be removed from the notches 2 without strong deformation.

Any relative displacement of the first and second structural members 1, 3 of the assembled structure is opposed by friction at the contact surfaces of said members. Such friction is enhanced by providing at least one of the edges of the second structural member 3 with a milled or serrated surface.

Thus as shown in FIGS. 12 and 13 a second structural member 3f is provided with a serrated edge 27 along with its lower wall 3″f, the serrations of said edge 27 engaging the lower projection bead 7 of each notch 2f in the first structural member 1, so as to oppose any accidental relative displacement of the two structural members 1, 3.

In the embodiment of FIGS. 12 and 13 the upper wall 3′f of the second structural member 3f has a bent-over edge 26 acting as a stiffening reinforcement. Alternatively, as shown in FIG. 14, the edge of the upper wall 3′g of the second structural member 3g may be turned over to form a tubular reinforcing bead 26a. Both edges of the member 3 may be reinforced in this way.

To effect permanent assembly of the first and second structural members the edges of the or each second structural member 3 between the walls of the first structural member 1 are deformed after assembly of the members. Thus referring to FIG. 15, B and C denote the sections of the edges of the second structural member 3 intermediate the opposite walls of the first structural member 1, these sections being deformed by bulging outwardly after assembly to prevent any relative displacement of the two structural members 1, 3.

The assembled open work structure can be stiffened in this way at its peripheral edges when the ends of the structural members 1, 3 and not held non-displaceably.

In the embodiments of FIGS. 1 to 15 the shaped notches 2 are cut in the first structural members 1 at their rear edges and are shaped so as to enclose fully the respective second structural members 3. With this arrangement the vertically extending first structural members 1 are more prominent, and are preferably arranged in a vertical direction.

In the embodiments shown in FIGS. 16 to 26, notches 2 are formed in the forwardly facing edges of the first structural members 1 and are shaped to enclose the rear portions only of the second structural members 3, the front portions of the latter extending beyond the notches 2. Since the second structural members 3 preferably extend horizontally, this arrangement makes the horizontal members of the resulting open work structure more prominent.

In FIGS. 16 and 17 three different forms of first structural members, 1c, 1d, 1e are shown, having respective shaped notches 2h in their front edges, each notch 2h being bounded by two opposite symmetrical edges converging towards the base of the notch. The member 1e is of channel section with its base web facing forwardly and provided with the notches 2h. Alternatively, the first structural members may be of solid cross section. Such members may be formed of metal, for example extruded aluminium 1e or thin stainless steel strip 1d, or of plastics, such as, for example, that known by the trade name "Delrin."

The upper edge of each notch 2h is of a saw tooth profile (FIG. 17) comprising an outer section 28 and an inner section 30 separated from the outer section 28 by an intermediate section 32 extending vertically. Similarly, the lower edge comprising an outer section 29 and an inner section 31 separated from the outer section by a vertical intermediate section 33.

Respective second structural members 3h of shaped channel section, fit into the notches 2h. Each member 3h has converging walls 3′h, 3″h provided with respective converging rear edges 34, 35 connected to the walls 3′h, 3″h by respective integral vertical sections 36, 37 extending outwardly to form saw tooth profiles adapted for fit closely to the profiles of the notches 3h upon assembly of the structure. The base web interconnecting the two opposite walls 3′h, 3″h of the member 3h projects forwardly of the shaped notches 2h.

In order to improve interengagement of the two types of structural members 1, 3, structural members in accordance with the modified embodiment shown in FIGS. 18 and 19 can be employed. First structural members 1f of channel section are provided and are each formed on their forward edge with notches 2i. Each notch 2i comprises two vertically spaced symmetrical recesses 38, 39

(FIG. 19) separated by a central tongue 40 fast with the base of the respective flange of the structural member 1f. The side walls of each notch are parallel to each other.

Each tongue 40 increases in width towards its base, but is formed with a neck of narrower width at its base, said neck being defined by two semicircular detents 41, 42 which constitute respective enlargements of the base of each recess 38, 39. Channel section second structural members 3i cooperate with the notches 2i. Each member 3i comprises a front V-shaped portion and two parallel rear flanges 3'i, 3"i formed with respective symmetrically inturned rear edges 43, 44. The rear edges 43, 44 are adapted to snap into the detents 41, 42 of each respective notch 2i to prevent disengagement of the second structural member from the notch 2i. The flanges abut the side walls of the notch.

In order to improve stiffness of the resulting open work structure pairs of structural members according to a further modification shown in FIGS. 20 to 26 may be employed. First structural members 1g have at their forward edges notches 2k bounded by two parallel edges 45, 46 provided at their inner (i.e. rear) ends with enlarged regions 47, 48 which are symmetrically arranged. Two tongues 49 are cut in the opposite walls 1'g, 1"g of the member 1g, the said tongues 49 being symmetrically turned outwardly before assembly of the open work structure, as shown in FIGS. 20, 21 and 22.

A channel-section second structural member 3k (FIG. 23) is engaged in each notch 2k in the first structural members 1g. The structural member 3k is formed with a forward V-shaped portion and two parallel flanges 3'k, 3"k provided with respective symmetrical outwardly flared rear edges 50, 51 which are adapted to snap into the enlarged regions 47, 48 of respective notches 2k upon assembly of the structure.

After assembly, the tongues 49 are subsequently bent as shown in FIGS. 24 and 25 to the inside of the channel section of the second structural member 3k, thereby completing interconnection of the structural member 1g, 3k.

In order to prevent any axial displacement of the second structural members 3k with respect to the first type structural members 1g, portions B', C' of the rear edges of the each second structural member 3k intermediate the opposite walls 1'g, 1"g of the first structural member 1g are deformed, for example by bulging as shown in FIG. 26.

The two types of structural members 1, 3 in the above-described embodiments are advantageously made from stainless steel strip being to the desired form; the notches 2 in the first structural members 1 may conveniently be cut before bending the strip. After bending, the outer surfaces of the strip may be polished by a continuous process in an automatic cycle at high speed and low cost, before cutting the strip into lengths to form the structural members 1, 3.

With some materials the work-hardening caused by the bending or shaping of the strip is sufficient to impart elastic properties to the second structural member 3, so that the latter are resiliently retained in the notches 2 of the first structural members 1 upon assembly of the open work structure.

The first structural members 1 may alternatively be made of metal strip of channel section provided with a coating of plastics to provide an ornamental effect differing from a metallic finish.

An open work structure may be assembled from structural members formed wholly of metal, or plastics, or plastic-coated metal. Structural members of different materials may alternatively be arranged in a predetermined pattern to give various ornamental effects.

The open work structures assembled from the structural members as described above are of small weight and are easily and quickly assembled. Moreover, the structures are of high quality finish, as they are not spoiled by localized heat treatments such as welding.

The structures may moreover be disassembled to permit re-assembly of the structural members in an arrangement different from the initial arrangement, for example, with different spacings between the first structural members 1.

The spacing of the second structural members 3 is invariable and is determined by the position and spacing of the notches 2.

The above structural members according to the invention are advantageously employed, for example, for forming open work grille structures for the radiators of motor vehicles.

What is claimed is:

1. A grille structure formed by an assembly of interconnected elongated structural members comprising a set of first structural members each having a plurality of spaced apart notches and a set of second structural members of channel section engaged by snap action in the notches of the first structural members, each notch having projected from its base a tongue dividing the notch at its base into two recesses, the tongue being formed at its base with a narrow neck to define a detent at the base of each recess; and each second structural member having two flanges that are formed with an inturned edge that is snap-engaged in a detent in a notch of a first structural member.

2. The grille structure of claim 1 in which the tongue of each notch increases in width towards the detents at its base, the detents being substantially semi-circular.

3. The grille structure of claim 1 in which each notch has side walls that are substantially parallel, and the flanges of each second structural member are also substantially parallel and abut the side walls of the notches in which they engage.

4. The grille structure of claim 1 in which each second structural member has a web portion of V-shape in cross-section, the web portion being located in the assembly outwardly of the notches in the first structural member.

5. In an open work grille structure, an assembly of interconnectable elongated structural members comprising at least one first structural member having a base and side walls, the side walls having aligned notches with lips projecting into the notch opening; and at least one second structural member having a base, a first side wall with a reinforced edge, and a second side wall with a continuous serrated edge capable of co-acting at any point along the edge with the projecting lips of the first structural member to snap-engage and lock the first structural member to the second structural member.

6. An assembly as claimed in claim 5, in which the reinforced edge has a circular configuration and the serrated edge projects outwardly relative to the first side wall.

References Cited

UNITED STATES PATENTS

| | | | |
|---|---|---|---|
| 1,991,506 | 2/1935 | Kellogg | 52—669 |
| 1,996,046 | 3/1935 | Green | 52—669 |
| 2,420,112 | 5/1947 | Utzler | 52—664 X |
| 2,905,286 | 9/1959 | Adams et al. | 52—669 X |
| 3,044,586 | 7/1962 | Cassels | 52—668 |
| 3,248,837 | 5/1966 | Newell et al. | 52—669 X |
| 3,291,978 | 12/1966 | Greenberg et al. | 52—664 X |

FOREIGN PATENTS 1,358,334   3/1964   France.

PRICE C. FAW, JR., Primary Examiner